US012057049B2

(12) United States Patent
Tanaka

(10) Patent No.: US 12,057,049 B2
(45) Date of Patent: Aug. 6, 2024

(54) DRIVER AND ELECTROOPTICAL APPARATUS

(71) Applicant: SEIKO EPSON CORPORATION, Tokyo (JP)

(72) Inventor: Kazuaki Tanaka, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/360,280

(22) Filed: Jul. 27, 2023

(65) Prior Publication Data

US 2024/0038124 A1 Feb. 1, 2024

(30) Foreign Application Priority Data

Jul. 29, 2022 (JP) ................................. 2022-121351

(51) Int. Cl.
*G09G 3/20* (2006.01)
*G09G 3/36* (2006.01)

(52) U.S. Cl.
CPC ......... *G09G 3/2011* (2013.01); *G09G 3/3614* (2013.01); *G09G 3/3622* (2013.01); *G09G 2290/00* (2013.01); *G09G 2320/0276* (2013.01); *G09G 2380/10* (2013.01)

(58) Field of Classification Search
CPC .. G09G 3/2011; G09G 3/3614; G09G 3/3622; G09G 2290/00; G09G 2320/0276; G09G 2380/10; G09G 3/04; G09G 3/2014
See application file for complete search history.

(56) References Cited

U.S. PATENT DOCUMENTS

| | | | | |
|---|---|---|---|---|
| 2006/0197729 | A1 | 9/2006 | Shiraishi et al. | |
| 2011/0169814 | A1* | 7/2011 | Van Ess | G09G 3/04 345/212 |
| 2016/0253974 | A1* | 9/2016 | Fellinger | G09G 3/2014 345/208 |
| 2020/0184876 | A1* | 6/2020 | Yamauchi | G09G 3/04 |
| 2021/0005129 | A1 | 1/2021 | Kondo | |
| 2021/0005157 | A1 | 1/2021 | Takizawa et al. | |

FOREIGN PATENT DOCUMENTS

| | | | |
|---|---|---|---|
| JP | 9-5775 | A | 1/1997 |
| JP | 9-54310 | A | 2/1997 |
| JP | 11-327464 | A | 11/1999 |
| JP | 2006-243560 | A | 9/2006 |
| JP | 2021-12267 | A | 2/2021 |
| JP | 2021-12268 | A | 2/2021 |

* cited by examiner

*Primary Examiner* — Richard J Hong
(74) *Attorney, Agent, or Firm* — Rankin, Hill & Clark LLP

(57) ABSTRACT

A driver includes a first terminal, a second terminal, a control circuit, a first drive circuit, and a second drive circuit. The control circuit outputs a first pulse width signal group and a second pulse width signal group. The first drive circuit outputs a first segment drive signal to the first terminal based on a pulse width signal selected according to grayscale data. The second drive circuit outputs a second segment drive signal to the second terminal based on the pulse width signal selected according to the grayscale data. The first terminal is coupled to a first segment electrode and the second terminal is coupled to a second segment electrode.

8 Claims, 17 Drawing Sheets

FIG. 12

| GRAYSCALE DATA | | | | GRAYSCALE LEVEL |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

FIG. 14

| D7 | D6 | D5 | D4 | D3 | D2 | D1 | D0 | DETAILS | |
|---|---|---|---|---|---|---|---|---|---|
| P17 | P16 | P15 | P14 | P13 | P12 | P11 | P10 | PARAMETER 1 | GRAYSCALE LEVEL1 (GS1[1]) GRAYSCALE DENSITY SETTING |
| P27 | P26 | P25 | P24 | P23 | P22 | P21 | P20 | PARAMETER 2 | GRAYSCALE LEVEL2 (GS1[2]) GRAYSCALE DENSITY SETTING |
| P37 | P36 | P35 | P34 | P33 | P32 | P31 | P30 | PARAMETER 3 | GRAYSCALE LEVEL3 (GS1[3]) GRAYSCALE DENSITY SETTING |
| P47 | P46 | P45 | P44 | P43 | P42 | P41 | P40 | PARAMETER 4 | GRAYSCALE LEVEL4 (GS1[4]) GRAYSCALE DENSITY SETTING |
| P57 | P56 | P55 | P54 | P53 | P52 | P51 | P50 | PARAMETER 5 | GRAYSCALE LEVEL5 (GS1[5]) GRAYSCALE DENSITY SETTING |
| P67 | P66 | P65 | P64 | P63 | P62 | P61 | P60 | PARAMETER 6 | GRAYSCALE LEVEL6 (GS1[6]) GRAYSCALE DENSITY SETTING |
| P77 | P76 | P75 | P74 | P73 | P72 | P71 | P70 | PARAMETER 7 | GRAYSCALE LEVEL7 (GS1[7]) GRAYSCALE DENSITY SETTING |
| P87 | P86 | P85 | P84 | P83 | P82 | P81 | P80 | PARAMETER 8 | GRAYSCALE LEVEL8 (GS1[8]) GRAYSCALE DENSITY SETTING |
| P97 | P96 | P95 | P94 | P93 | P92 | P91 | P90 | PARAMETER 9 | GRAYSCALE LEVEL9 (GS1[9]) GRAYSCALE DENSITY SETTING |
| P107 | P106 | P105 | P104 | P103 | P102 | P101 | P100 | PARAMETER 10 | GRAYSCALE LEVEL10 (GS1[10]) GRAYSCALE DENSITY SETTING |
| P117 | P116 | P115 | P114 | P113 | P112 | P111 | P110 | PARAMETER 11 | GRAYSCALE LEVEL11 (GS1[11]) GRAYSCALE DENSITY SETTING |
| P127 | P126 | P125 | P124 | P123 | P122 | P121 | P120 | PARAMETER 12 | GRAYSCALE LEVEL12 (GS1[12]) GRAYSCALE DENSITY SETTING |
| P137 | P136 | P135 | P134 | P133 | P132 | P131 | P130 | PARAMETER 13 | GRAYSCALE LEVEL13 (GS1[13]) GRAYSCALE DENSITY SETTING |
| P147 | P146 | P145 | P144 | P143 | P142 | P141 | P140 | PARAMETER 14 | GRAYSCALE LEVEL14 (GS1[14]) GRAYSCALE DENSITY SETTING |
| P157 | P156 | P155 | P154 | P153 | P152 | P151 | P150 | PARAMETER 15 | GRAYSCALE LEVEL15 (GS1[15]) GRAYSCALE DENSITY SETTING |

FIG. 15

| D7 | D6 | D5 | D4 | D3 | D2 | D1 | D0 | DETAILS | |
|---|---|---|---|---|---|---|---|---|---|
| P17 | P16 | P15 | P14 | P13 | P12 | P11 | P10 | PARAMETER 1 | GRAYSCALE LEVEL1 (GS2[1]) GRAYSCALE DENSITY SETTING |
| P27 | P26 | P25 | P24 | P23 | P22 | P21 | P20 | PARAMETER 2 | GRAYSCALE LEVEL2 (GS2[2]) GRAYSCALE DENSITY SETTING |
| P37 | P36 | P35 | P34 | P33 | P32 | P31 | P30 | PARAMETER 3 | GRAYSCALE LEVEL3 (GS2[3]) GRAYSCALE DENSITY SETTING |
| P47 | P46 | P45 | P44 | P43 | P42 | P41 | P40 | PARAMETER 4 | GRAYSCALE LEVEL4 (GS2[4]) GRAYSCALE DENSITY SETTING |
| P57 | P56 | P55 | P54 | P53 | P52 | P51 | P50 | PARAMETER 5 | GRAYSCALE LEVEL5 (GS2[5]) GRAYSCALE DENSITY SETTING |
| P67 | P66 | P65 | P64 | P63 | P62 | P61 | P60 | PARAMETER 6 | GRAYSCALE LEVEL6 (GS2[6]) GRAYSCALE DENSITY SETTING |
| P77 | P76 | P75 | P74 | P73 | P72 | P71 | P70 | PARAMETER 7 | GRAYSCALE LEVEL7 (GS2[7]) GRAYSCALE DENSITY SETTING |
| P87 | P86 | P85 | P84 | P83 | P82 | P81 | P80 | PARAMETER 8 | GRAYSCALE LEVEL8 (GS2[8]) GRAYSCALE DENSITY SETTING |
| P97 | P96 | P95 | P94 | P93 | P92 | P91 | P90 | PARAMETER 9 | GRAYSCALE LEVEL9 (GS2[9]) GRAYSCALE DENSITY SETTING |
| P107 | P106 | P105 | P104 | P103 | P102 | P101 | P100 | PARAMETER 10 | GRAYSCALE LEVEL10 (GS2[10]) GRAYSCALE DENSITY SETTING |
| P117 | P116 | P115 | P114 | P113 | P112 | P111 | P110 | PARAMETER 11 | GRAYSCALE LEVEL11 (GS2[11]) GRAYSCALE DENSITY SETTING |
| P127 | P126 | P125 | P124 | P123 | P122 | P121 | P120 | PARAMETER 12 | GRAYSCALE LEVEL12 (GS2[12]) GRAYSCALE DENSITY SETTING |
| P137 | P136 | P135 | P134 | P133 | P132 | P131 | P130 | PARAMETER 13 | GRAYSCALE LEVEL13 (GS2[13]) GRAYSCALE DENSITY SETTING |
| P147 | P146 | P145 | P144 | P143 | P142 | P141 | P140 | PARAMETER 14 | GRAYSCALE LEVEL14 (GS2[14]) GRAYSCALE DENSITY SETTING |
| P157 | P156 | P155 | P154 | P153 | P152 | P151 | P150 | PARAMETER 15 | GRAYSCALE LEVEL15 (GS2[15]) GRAYSCALE DENSITY SETTING |

FIG. 16

| P17 | P16 | P15 | P14 | P13 | P12 | P11 | P10 | DETAILS |
|---|---|---|---|---|---|---|---|---|
| * | * | * | * | 0 | 0 | 0 | 0 | 1.1% |
| * | * | * | * | 0 | 0 | 0 | 1 | 2.2% |
| * | * | * | * | 0 | 0 | 1 | 0 | 3.3% |
| * | * | * | * | 0 | 0 | 1 | 1 | 4.4% |
| * | * | * | * | 0 | 1 | 0 | 0 | 5.6% |
| * | * | * | * | 0 | 1 | 0 | 1 | 6.7% |
| * | * | * | * | 0 | 1 | 1 | 0 | 8.9% |
| * | * | * | * | 0 | 1 | 1 | 1 | 10.0% |
| * | * | * | * | 1 | 0 | 0 | 0 | 11.1% |
| * | * | * | * | 1 | 0 | 0 | 1 | 12.2% |
| * | * | * | * | 1 | 0 | 1 | 0 | 13.3% |
| * | * | * | * | 1 | 0 | 1 | 1 | 14.4% |
| * | * | * | * | 1 | 1 | 0 | 0 | 15.6% |
| * | * | * | * | 1 | 1 | 0 | 1 | 16.7% |
| * | * | * | * | 1 | 1 | 1 | 0 | 17.8% |
| * | * | * | * | 1 | 1 | 1 | 1 | 18.9% |

DRIVER AND ELECTROOPTICAL APPARATUS

The present application is based on, and claims priority from JP Application Serial Number 2022-121351, filed Jul. 29, 2022, the disclosure of which is hereby incorporated by reference herein in its entirety.

BACKGROUND

1. Technical Field

The present disclosure relates to a driver, an electrooptical apparatus, etc.

2. Related Art

In related art, drivers driving liquid crystal panels by static drive systems are known. For example, JP-A-2006-243560 discloses a driver statically driving segment electrodes of a liquid crystal panel by a pulse-width modulation system.

In the pulse-width modulation system, there is a failure that grayscale densities of the respective segment electrodes become unintended grayscale densities due to wiring capacity between the segment electrodes and terminals or the like.

SUMMARY

An aspect of the present disclosure relates to a driver driving a liquid crystal panel of a static drive system, including a first terminal coupled to a first segment electrode of the liquid crystal panel by a first wire, a second terminal coupled to a second segment electrode of the liquid crystal panel by a second wire having a wire length or a wire width different from that of the first wire, a control circuit outputting a first pulse width signal group containing a plurality of pulse width signals corresponding to a plurality of grayscale levels and a second pulse width signal group containing the plurality of pulse width signals corresponding to the plurality of grayscale levels, in which correlations between the grayscale levels and pulse widths are different from those of the first pulse width signal group, a first drive circuit outputting a first segment drive signal to the first terminal based on the pulse width signal selected from the first pulse width signal group according to grayscale data, and a second drive circuit outputting a second segment drive signal to the second terminal based on the pulse width signal selected from the second pulse width signal group according to the grayscale data.

Another aspect of the present disclosure relates to an electrooptical apparatus including the above described driver, the liquid crystal panel, and a backlight of the liquid crystal panel.

BRIEF DESCRIPTION OF THE DRAWINGS

FIG. 12 is a diagram for explanation of grayscale data and grayscale levels.

FIG. 14 is a diagram for explanation of grayscale density settings for the first pulse width signal group.

FIG. 15 is a diagram for explanation of grayscale density settings for the second pulse width signal group.

FIG. 16 shows a specific example of grayscale density settings for grayscale levels.

DESCRIPTION OF EXEMPLARY EMBODIMENTS

As below, embodiments will be explained. The embodiments to be described later do not unduly limit the description in What is Claimed is. Further, not all configurations to be described in the embodiments are essential component elements.

1. Configuration Example of Driver

Figure 1:
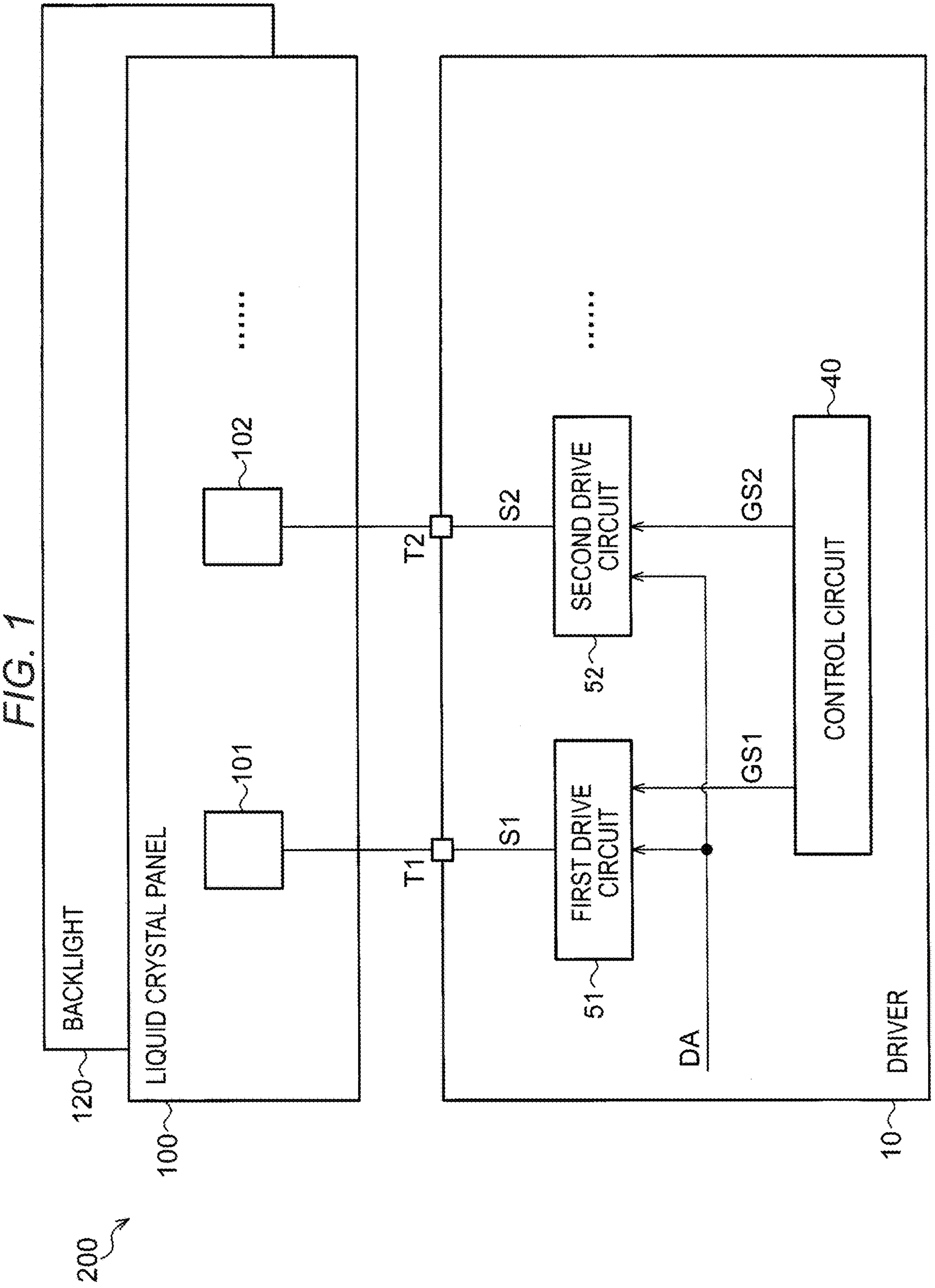
FIG. 1 shows a configuration example of a driver of an embodiment.

FIG. 1 shows a configuration example of a driver 10 of an embodiment. The driver 10 drives a liquid crystal panel 100 by a static drive system. The driver 10 of the embodiment relates to a driver IC driving a display in a panel or a display module such as a liquid crystal panel on which a velocity meter, a warning light, simplified navigation, etc. for an operator of a four-wheeled or two-wheeled vehicle to check for driving are displayed. The driver 10 of the embodiment relates to a circuit for grayscale display of a liquid crystal panel of a segment display type of passive liquid crystal using a driver IC, e.g., an LCD driver IC driving the liquid crystal panel 100 or the like by PWM (Pulse Wave Modulation) drive. Further, an electrooptical apparatus 200 of the embodiment includes the driver 10 and the liquid crystal panel 100. The electrooptical apparatus 200 may further include a backlight 120. The contents displayed on the liquid crystal panel 100 are not limited to the velocity meter, the warning light, the simplified navigation, or the like.

The liquid crystal panel 100 is an electrooptical panel. The liquid crystal panel 100 is a panel driven by the static drive system. Specifically, the liquid crystal panel 100 includes a first glass substrate, a second glass substrate, and liquid crystal. The liquid crystal is sealed between the first glass substrate and the second glass substrate. Segment electrodes are provided on the first glass substrate, and a common electrode is provided on the second glass substrate. The driver 10 outputs segment drive signals to the segment electrodes. Further, the driver 10 may output a common drive signal to the common electrode. Thereby, drive signals as potential differences between the segment drive signals and the common drive signal are applied to the liquid crystal between the segment electrodes and the common electrode. The segment electrodes and the common electrode are transparent electrodes of e.g., ITO (Indium Tin Oxide).

The backlight 120 is provided with e.g., a plurality of light emitting devices such as LEDs and placed on e.g., a back side of the liquid crystal panel 100. In this case, a diffuser plate may be provided between the liquid crystal panel 100 and the backlight 200.

The driver 10 is e.g., a circuit device called IC (Integrated Circuit). The driver 10 is e.g., an IC manufactured by a semiconductor process and a semiconductor chip with circuit elements formed on a semiconductor substrate. The driver 10 as the circuit device is mounted on e.g., a glass substrate of the liquid crystal panel 100. For example, the driver 10 is mounted on the first glass substrate on which the segment electrodes are provided. Or, the driver 10 may be mounted on a circuit board and the circuit board and the liquid crystal panel 100 may be coupled by a flexible board.

The driver 10 of the embodiment is a circuit device driving the liquid crystal panel 100 that displays e.g., a warning light, a velocity meter, simplified navigation, or the like for an operator of an automobile or a motorbike to check for driving. Note that the display contents of the liquid crystal panel 100 are not limited to the warning light, the velocity meter, or the simplified navigation. Further, the driver 10 of the embodiment is not limited to the driver of the liquid crystal panel 100 for image display, but may also be used as e.g., a driver of the liquid crystal panel 100 having a shutter function of light from the light emitting devices of the backlight 120. For example, the driver 10 of the embodiment may be a driver of the liquid crystal panel 100 for auto high beam of the headlight of the vehicle.

The driver 10 of the embodiment includes a first terminal T1, a second terminal T2, a control circuit 40, a first drive circuit 51, and a second drive circuit 52. In the following description, a case where the two of the first drive circuit 51 and the second drive circuit 52 and the two of the first terminal T1 and the second terminal T2 are provided is mainly explained as an example, however, the embodiment is not limited to that. Three or more drive circuits and three or more terminals may be provided in the driver 10.

The first terminal T1 is coupled to a first segment electrode 101 of the liquid crystal panel 100. The second terminal T2 is coupled to a second segment electrode 102 of the liquid crystal panel 100. The first terminal T1 and the second terminal T2 are coupled to the first segment electrode 101 and the second segment electrode 102 via e.g., segment wires on the glass substrate. The terminals are e.g., pads of the driver 10 as the circuit device. For example, in pad areas, metal layers are exposed from passivation films as insulating films and the exposed metal layers form the pads as the terminals of the driver 10. Note that the coupling in the embodiment is electrical coupling. The electrical coupling refers to coupling that enables transmission of electrical signals and transmission of information by the electrical signals. The electrical coupling may be coupling via passive elements or the like.

Figure 2:
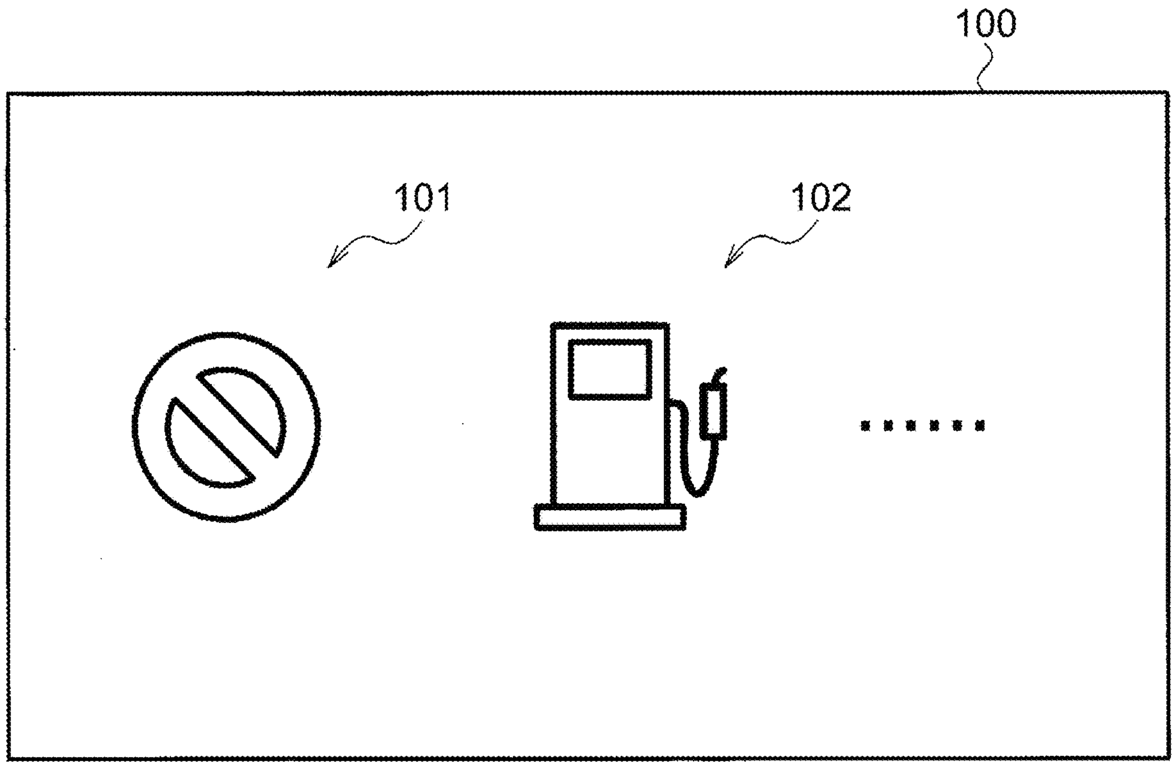
FIG. 2 shows an arrangement example of segment electrodes on a liquid crystal panel.

FIG. 2 shows an example of the first segment electrode 101 and the second segment electrode 102. The first segment electrode 101 and the second segment electrode 102 are provided on the liquid crystal panel 100. As shown in FIG. 2, the respective segment electrodes are e.g., electrodes for displaying icons of a warning in a cluster panel of an automobile etc.

The control circuit 40 outputs a first pulse width signal group GS1 containing a plurality of pulse width signals corresponding to a plurality of grayscale levels. Further, the control circuit 40 outputs a second pulse width signal group GS2 containing a plurality of pulse width signals corresponding to a plurality of grayscale levels, in which correlations between the grayscale levels and the pulse widths are different from those of the first pulse width signal group GS1. The pluralities of pulse width signals contained in the pulse width signal groups GS1 and GS2 are signals used for driving of PWM (Pulse Width Modulation) as pulse width modulation. The grayscale levels are set by grayscale data DA. Further, the respective grayscale levels of the plurality of grayscale levels and the respective pulse width signals of the pulse width signal groups GS1 and GS2 are correlated by grayscale density setting data. The control circuit 40 is e.g., a logic circuit and may be realized by e.g., an ASIC (Application Specific Integrated Circuit) by automatic placement and routing such as a gate array.

Figure 3:
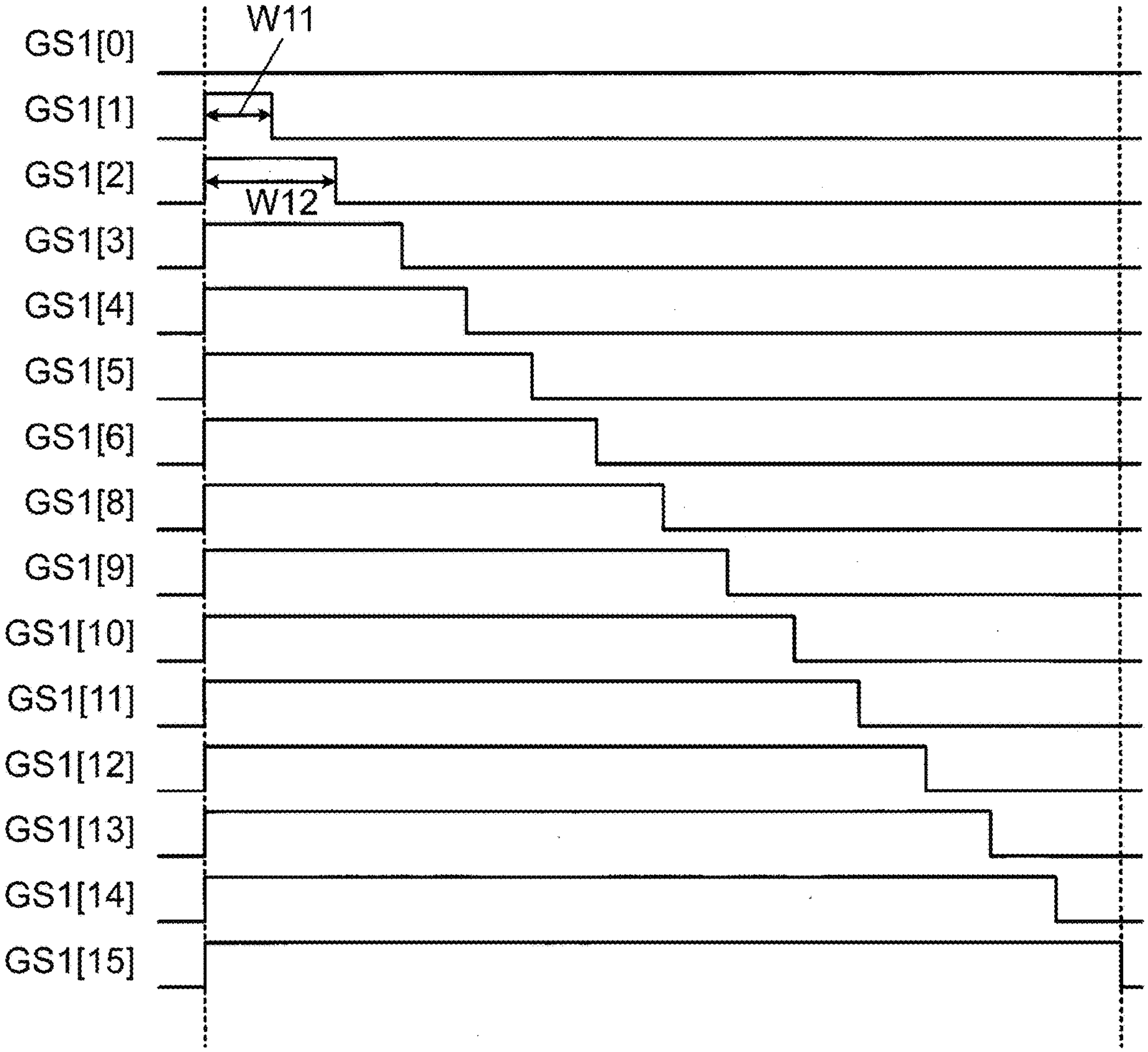
FIG. 3 shows an example of signal waveforms of a first pulse width signal group.
Figure 4:
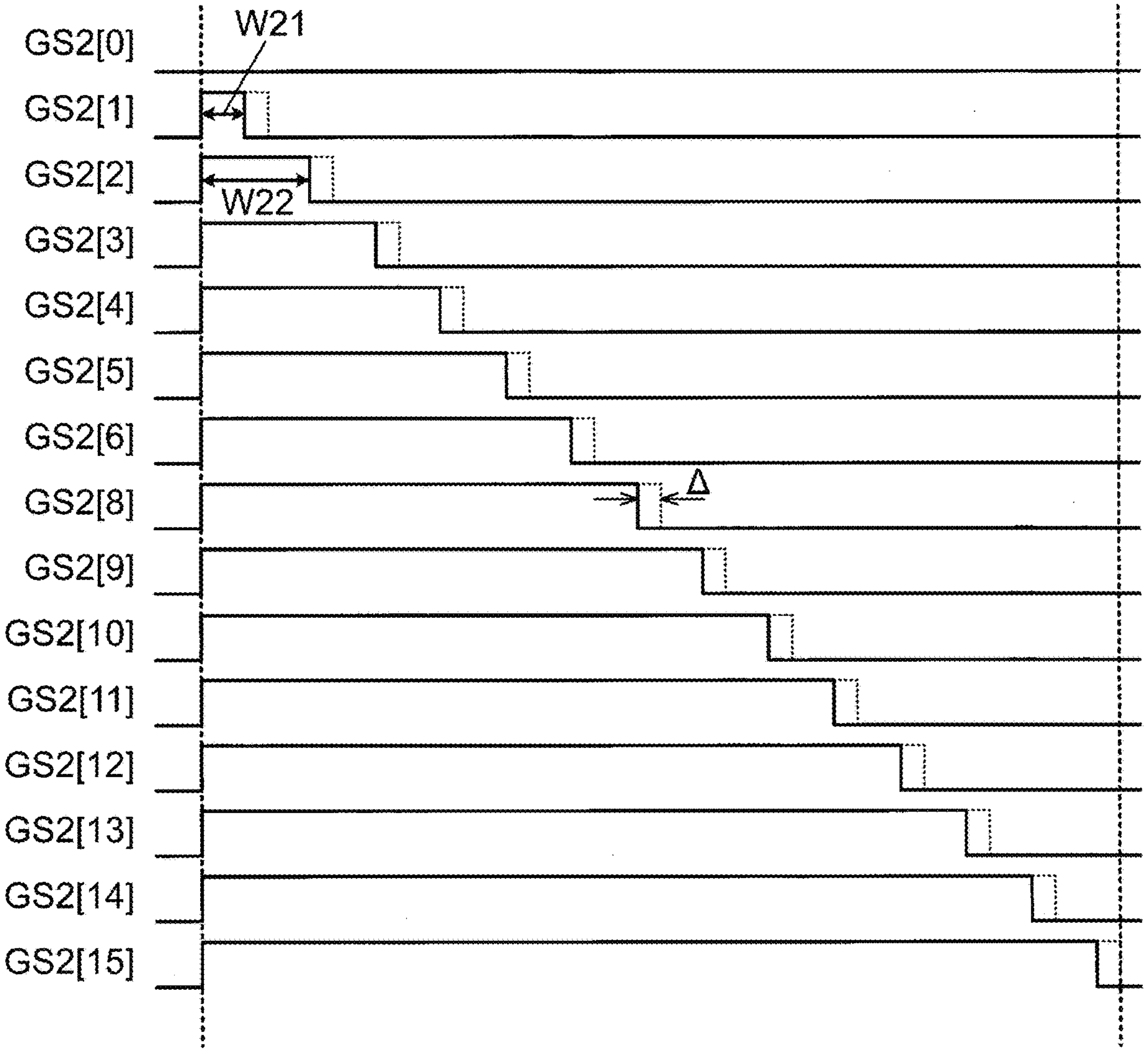
FIG. 4 shows an example of signal waveforms of a second pulse width signal group.

FIGS. 3 and 4 show examples of signal waveforms of the respective pulse width signal groups GS1 and GS2. The respective pulse width signal groups GS1 and GS2 contain pulse width signals corresponding to 16 levels of grayscale levels [0] to [15]. Here, the grayscale level [0] corresponds to e.g., the darkest grayscale display and the grayscale level corresponds to e.g., the brightest grayscale display. Note that the waveforms of the first pulse width signal group GS1 and the second pulse width signal group GS2 shown in FIGS. 3 and 4 are just examples, and pulse width signal groups having various waveforms may be generated by grayscale density settings or the like.

In the first pulse width signal group GS1 shown in FIG. 3, the pulse width of a pulse width signal GS1 [1] is W11, the pulse width of a pulse width signal GS1 [2] is W12, . . . . Further, the pulse widths of the respective pulse width signals are set by grayscale density setting data, which will be described later, and thereby, the respective grayscale levels are set. Also, in the second pulse width signal group GS2 shown in FIG. 4, the pulse width of a pulse width signal GS2 [1] is W21, the pulse width of a pulse width signal GS2 [2] is W22, Here, the respective pulse width signals GS2 [0] to of the second pulse width signal group GS2 are entirely set to have the shorter pulse widths than the respective pulse width signals GS1 [0] to of the first pulse width signal group GS1. It is known that, in FIG. 4, falls shown by broken lines are of the waveforms of the respective pulse width signals GS1 [0] to of the first pulse width signal group GS1, and the respective pulse width signals GS2 [0] to of the second pulse width signal group GS2 shown by solid lines fall earlier by Δ and the pulse widths are shorter. As described above, the correlations between the grayscale levels and the pulse widths are different between the first pulse width signal group GS1 and the second pulse width signal group GS2. That is, the correlations between the grayscale levels and the grayscale densities are different. Note that, in FIGS. 3 and 4, a case where the pulse widths increase by equal widths is shown for simplicity of explanation, however, actually, the pulse widths corresponding to gamma correction of the liquid crystal panel 100 are set.

The first drive circuit 51 and the second drive circuit 52 are segment drive circuits and drive the segment electrodes of the liquid crystal panel 100 by PWM. The first drive circuit 51 outputs a first segment drive signal S1 based on the pulse width signal selected from the first pulse width signal group GS1 according to the grayscale data DA for setting the plurality of grayscale levels to the first terminal T1. For example, the first drive circuit 51 selects the pulse width signal from the first pulse width signal group GS1 based on the grayscale data DA. Then, the first drive circuit 51 performs e.g., polarity inversion, level shift, buffering of the selected pulse width signal, and outputs the first segment drive signal S1 to the first terminal T1. Also, the second drive circuit 52 outputs a second segment drive signal S2 based on the pulse width signal selected from the second pulse width signal group GS2 according to the grayscale data DA to the second terminal T2. Then, the second drive circuit 52 performs e.g., polarity inversion, level shift, buffering of the selected pulse width signal, and outputs the second segment drive signal S2 to the second terminal T2.

Figure 5:
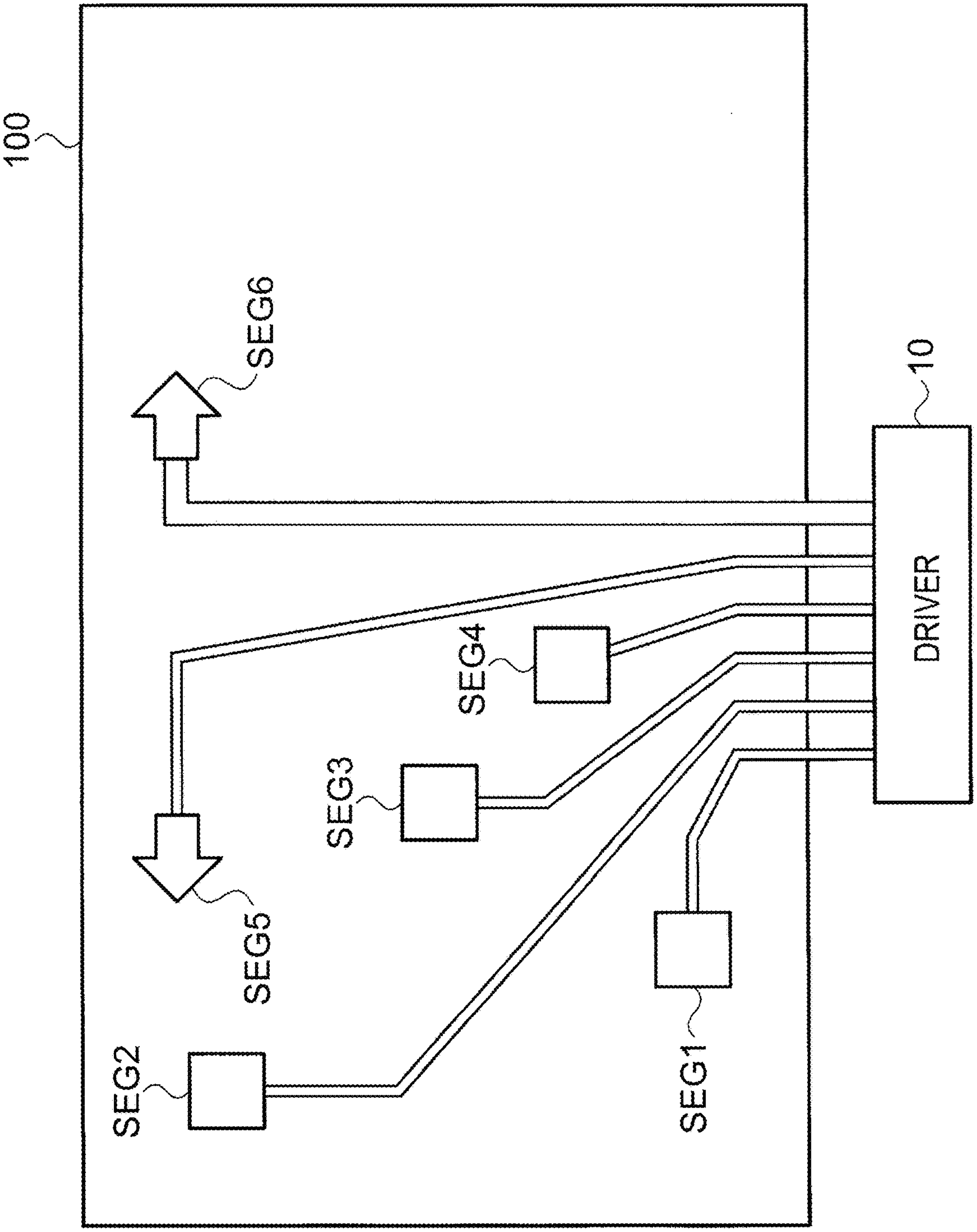
FIG. 5 shows an example of a wiring form between the segment electrodes on the liquid crystal panel and the driver.

FIG. 5 is a schematic diagram showing an example of the liquid crystal panel 100 on which a plurality of segment electrodes SEG1 to SEG6 are provided. As shown in FIG. 5, the wire lengths and wire thicknesses from the respective terminals of the driver 10 to the respective segment electrodes SEG1 to SEG6 are different depending on the display positions of the respective segment electrodes SEG1 to SEG6.

Regarding the segment electrode SEG1 and the segment electrode SEG2, while the segment electrode SEG1 is provided in a position closer to the driver 10 within the liquid crystal panel 100, the segment electrode SEG2 is provided on the upper left side within the liquid crystal panel 100 apart from the driver 10. Accordingly, of the segment electrode SEG1 and the segment electrode SEG2, the segment electrode SEG2 is at a longer distance from the terminal of the driver 10. Regarding the segment electrode SEG3 and the segment electrode SEG4, the segment electrode SEG3 has a longer wire length than the segment electrode SEG4. Regarding the segment electrode SEG5 and the segment electrode SEG6, the wire lengths from the terminals of the driver 10 to the respective segment electrodes are substantially equal, but the wire widths are different. The wire width of the wire to the segment electrode SEG6 is wider.

As described above, regarding the segment electrode SEG1 and the segment electrode SEG2 having different wire lengths, the segment electrode SEG2 having the longer wire length corresponds to e.g., the first segment electrode 101 and the segment electrode SEG1 having the shorter wire length corresponds to e.g., the second segment electrode 102. Similarly, regarding the segment electrode SEG3 and the segment electrode SEG4 having different wire lengths, the segment electrode SEG3 having the longer wire length corresponds to e.g., the first segment electrode 101 and the segment electrode SEG4 having the shorter wire length corresponds to e.g., the second segment electrode 102. Regarding the segment electrode SEG5 and the segment electrode SEG6 having different wire widths, the segment electrode SEG5 having the narrower wire width corresponds to e.g., the first segment electrode 101 and the segment electrode SEG6 having the wider wire width corresponds to e.g., the second segment electrode 102. Note that, in the above description, the wire lengths or the wire widths are compared with a focus on e.g., the segment electrode SEG1 and the segment electrode SEG2, however, the segment electrodes with a focus thereon may be optionally determined.

As described above, in the embodiment, the plurality of segment electrodes are provided on the liquid crystal panel 100, and the wire from the first terminal T1 provided in the driver 10 to the first segment electrode 101 and the wire from the second terminal T2 to the second segment electrode 102 are different in wire length or wire width. Note that, in the above description, both the wire length and the wire width may be different.

Figure 6:
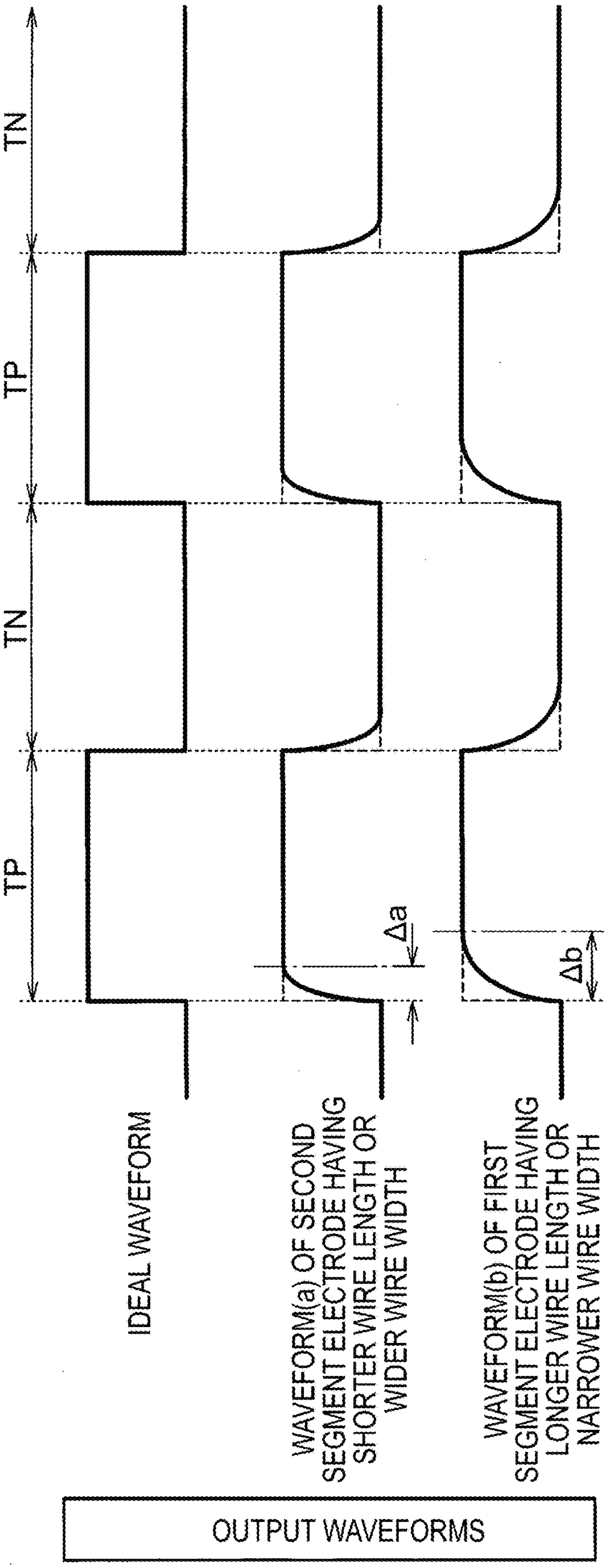
FIG. 6 is a diagram for explanation of rounding of output waveforms in the segment electrodes.

FIG. 6 is a diagram for comparison between ideal output waveforms and real output waveforms of the segment drive signals driving the liquid crystal panel 100. The respective output waveforms are output waveforms with respect to input waveforms at duty ratios of 100% between positive polarity periods TP and negative polarity periods TN. The waveform shown in the top part of FIG. 6 is the ideal output waveform without signal degradations, and the waveforms shown in the middle part and the bottom part are real output waveforms in which signal degradations appear due to wire resistance, parasitic capacitance, or the like.

Between the output waveform shown in the middle part and the output waveform shown in the bottom part in FIG. 6, differences appear in degrees of signal degradations from the ideal output waveform shown in the top part due to differences in wire length and wire width. The output waveform shown in the middle part is the real output waveform in the second segment electrode 102 with the shorter wire length or the wider wire width and rounding appears in the rise waveform in the positive polarity periods TP. Specifically, the waveform takes a time Aa from the start of the positive polarity period TP to change from the low level to the high level. Also, in the negative polarity period TN, the waveform takes the time Aa from the start of the negative polarity period TN to change from the high level to the low level.

On the other hand, the output waveform shown in the bottom part of FIG. 6 is the output waveform in the first segment electrode 101 with the longer wire length or the narrower wire width and takes a longer time Ab than the above described time Aa from the start of the positive polarity period TP to change from the low level to the high level. Also, in the negative polarity period TN, the waveform takes the longer time Ab than the above described time Aa from the start of the negative polarity period TN to change from the high level to the low level. As described above, the longer the wirelengths from the respective terminals T1 and T2 of the driver 10 to the respective segment electrodes 101, 102 or the narrower the wire widths, the more prominently rounding in the rise waveforms and the fall waveforms of the output signals appear and the more degraded the respective segment drive signals S1, S2 become.

Here, for example, in FIG. 5, regarding the segment electrode SEG1 and the segment electrode SEG2, the segment electrode SEG2 having the longer wire length corresponds to the first segment electrode 101 and the segment electrode SEG1 having the shorter wire length corresponds to the second segment electrode 102. The output waveform of the first segment drive signal S1 output to the first segment electrode 101 having the longer wirelength and more affected by the parasitic capacitance or the like is the waveform as shown by (b) in the bottom part of FIG. 6. Further, the waveform of the second segment drive signal S2 output to the second segment electrode 102 having the shorter wirelength and less affected by the parasitic capacitance or the like is the waveform as shown by (a) in the middle part of FIG. 6.

When rounding of the waveforms is produced at the start of the positive polarity periods TP shown in the middle part and the bottom part of FIG. 6, the effective voltages in the positive polarity periods TP become lower by the amounts of rounding. Also, in the negative polarity periods TN, the effective voltages become lower by the amounts of rounding in the falls of the waveforms. In the case of the second segment electrode 102 having the shorter wirelength or the wider wire width shown by (a) in FIG. 6 and the case of the first segment electrode 101 having the longer wirelength and the narrower wire width shown by (b) of FIG. 6, the effective voltages applied to the respective segment electrodes 101 and 102 are lower than that in the case of the ideal output waveform according to the delay widths Aa and Ab due to the rounding of the respective waveforms. Particularly, in the case of the first segment electrode 101 having the longer wirelength or the narrower wire width shown by (b) of FIG. 6, the delay widths Ab in the rise in the positive polarity period TP and the fall in the negative polarity period TN are larger, and the lowering of the effective voltages applied to the respective segment electrodes 101 and 102 is more prominent.

Accordingly, to address the problem of lowering of the effective voltages applied to the respective segment electrodes 101 and 102 due to the parasitic capacitance or the like, the pulse widths of the respective pulse width signals of the first pulse width signal group GS1 and the second pulse width signal group GS2 described in FIGS. 3 and 4 are made different, and thereby, the amounts of reduction of the effective voltages may be corrected. That is, the respective pulse widths of the second pulse width signal group GS2 corresponding to the icons with the shorter wire lengths or the wider wire widths are shortened by A, and thereby, the prominent reduction of the effective values of the output voltages occurring in the icons with the longer wire lengths or the narrower wire widths may be balanced.

In the embodiment, the second pulse width signal group GS2 is a signal group having shorter pulse widths with respect to the grayscale levels than the first pulse width signal group GS1.

In the first pulse width signal group GS1, rounding of the output waveforms prominently appears due to wiring resistance and the parasitic capacitance, and the amount of reduction of the effective voltage applied to the first segment electrode 101 becomes larger. However, in the embodiment, the pulse widths of the respective pulse width signals of the second pulse width signal group GS2 are set to be shorter than the pulse widths of the respective pulse width signals of the first pulse width signal group GS1, and thereby, the amount of reduction of the effective voltage applied to the first segment electrode 101 may be balanced. Therefore, the grayscale densities of the respective icons of the liquid crystal panel 100 may be homogenized. Note that the respective pulse width signals are selected from the first pulse width signal group GS1 and the second pulse width signal group GS2 based on first grayscale density setting data and second grayscale density setting data stored in a register unit 42, which will be described later in FIG. 9.

In the driver disclosed in JP-A-2006-243560 or the like, the grayscale settings are used for adjustment of the grayscale levels of the icons etc. in the grayscale display function. The adjustment of the grayscale densities can be made, however, the grayscale levels that can be displayed at the same time are restricted, and the use for homogenizing brightness of the icons having a difference in brightness is not assumed. Further, regarding the grayscale settings of the driver, as the output of the driver, the PWM waveform can be output and the setting of the PWM width is adjustable by command input or the like. However, the grayscale levels that can be set to be output at the same time are limited to e.g., four levels. In this regard, in the embodiment, 16 levels or more grayscale levels can be set to be output at the same time. As described above, in the driver disclosed in JP-A-2006-243560 or the like, the function of grayscale display is exclusively used for grayscale display of icons and the use for homogenizing the brightness of the icons is not assumed and the grayscale levels are not finely adjustable. However, in the embodiment, the finely adjustable grayscale display function may be used for homogenization of the brightness of the icons. The grayscale level of a specific icon as a reference for homogenization of the brightness is set by RAM data, for example, with respect to the grayscale density set by a command, the grayscale densities between the icons having different brightness is adjusted to be equal to the brightness of the icon as the reference.

For example, in large liquid crystal panels having 10-inch or larger sizes, wire lengths coupling the drivers and the icons of the liquid crystal panels are different depending on the placement positions of the icons and parasitic wiring resistances and wiring capacitances are different. The capacitance components of the electrodes are different depending on the sizes of the icons. Due to the parasitic RC components, rounding appears in the waveforms of the output signals of the driver 10 and the effective values of the drive voltages differ. The brightness of the respective icons on the liquid crystal panel 100 vary. However, according to the embodiment, when the effective values of the voltages applied to the respective segment electrodes 101 and 102 are different and the brightness of the icons becomes inhomogeneous, the brightness of the icons can be homogenized by adjustment of the brightness of the respective icons by the finely adjustable grayscale density settings mounted on the driver 10.

As described above, the driver 10 of the embodiment is the driver driving the liquid crystal panel of the static drive system, including the first terminal T1, the second terminal T2, the control circuit 40, the first drive circuit 51, and the second drive circuit 52. The first terminal T1 is coupled to the first segment electrode 101 of the liquid crystal panel by a first wire L1. The second terminal T2 is coupled to the second segment electrode 102 of the liquid crystal panel by a second wire L2 having the wire length or the wire width different from that of the first wire L1. The control circuit 40 outputs the first pulse width signal group GS1 and the second pulse width signal group GS2. The first pulse width signal group GS1 contains the plurality of pulse width signals corresponding to the plurality of grayscale levels. The second pulse width signal group GS2 contains the plurality of pulse width signals corresponding to the plurality of grayscale levels and outputs the signals having different correlations between the grayscale levels and the pulse widths from the first pulse width signal group GS1. The first drive circuit 51 outputs the first segment drive signal S1 to the first terminal T1 based on the pulse width signal selected from the first pulse width signal group GS1 according to the grayscale data. The second drive circuit 52 outputs the second segment drive signal S2 to the second terminal T2 based on the pulse width signal selected from the second pulse width signal group GS2 according to the grayscale data.

In the above described manner, the first segment electrode 101 of the liquid crystal panel 100 is driven by the first segment drive signal S1 generated based on the grayscale data DA and the first pulse width signal group GS1. Further, the second segment electrode 102 of the liquid crystal panel 100 is driven by the second segment drive signal S2 generated based on the grayscale data DA and the second pulse width signal group GS2. As described in FIGS. 3 and 4, the first pulse width signal group GS1 and the second pulse width signal group GS2 are pulse width signal groups having different correlations between the grayscale levels set by the grayscale data DA and the pulse widths of the respective pulse width signals. Therefore, even the same grayscale data DA can make the pulse widths in the PWM drive different between the first segment electrode 101 driven by the first drive circuit 51 and the second segment electrode 102 driven by the second drive circuit 52. For the first segment electrode 101 and the second segment electrode 102 having different wire lengths or wire widths and different wiring loads from the terminals to the segment electrodes, the segment drive signals S1 and S2 having the pulse widths according to the respective wiring loads may be set. Therefore, in order not to display the respective segment electrodes to be displayed in predetermined grayscale densities in different grayscale densities from the predetermined grayscale densities by the respective wiring loads, appropriate pulse widths may be set. Therefore, the first segment electrode 101 and the second segment electrode 102 can be displayed in predetermined grayscale densities.

Note that, even when the wire lengths and the wire widths are equal, the wires are placed adjacent to other more wires and the parasitic capacitances between the wires are larger. The method of homogenizing the grayscale densities according to the embodiment may be used for addressing the reduction of the effective voltage with the increase of the wiring capacitance due to the above described cause.

Figure 7:
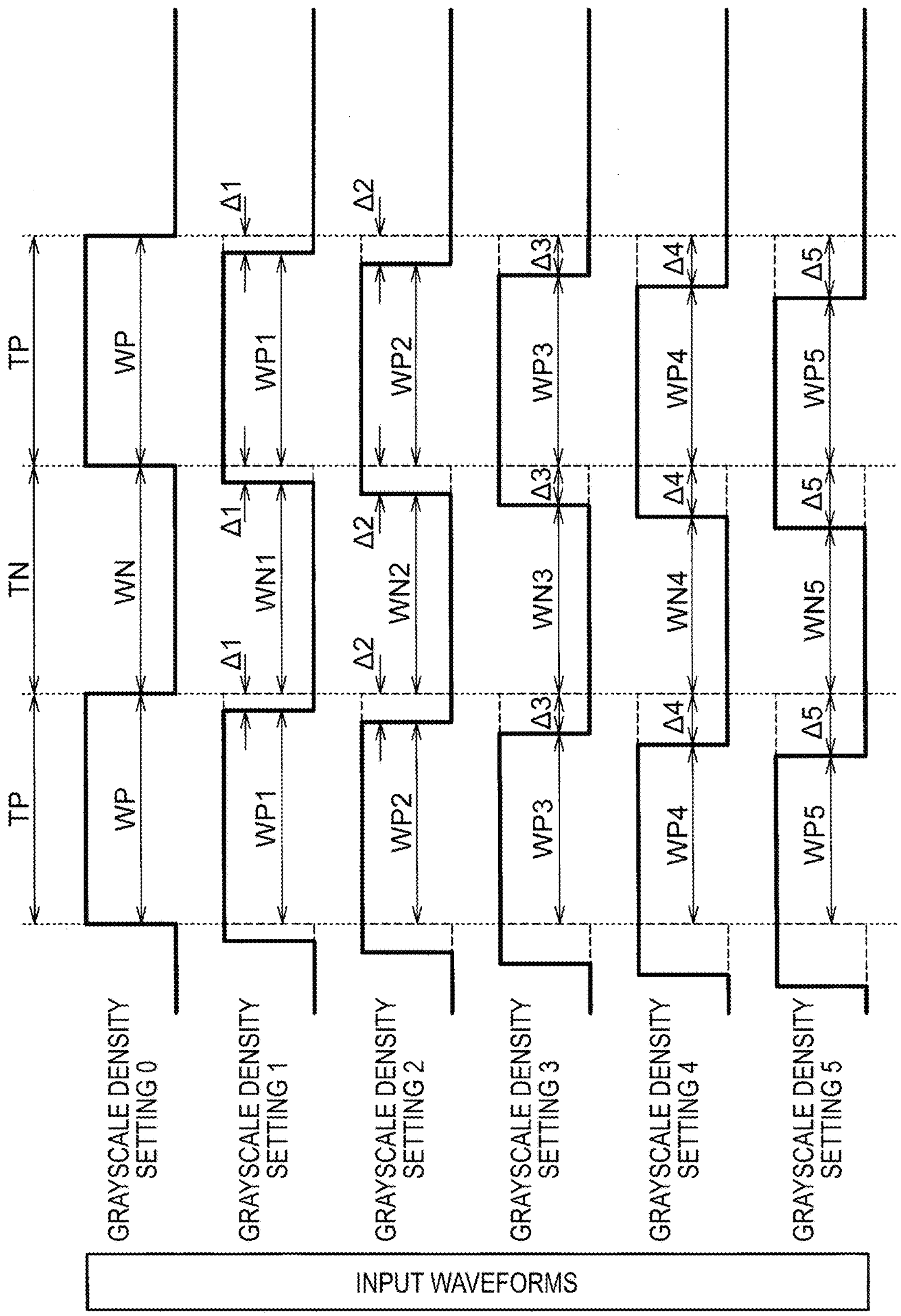
FIG. 7 is a diagram for explanation of setting options of input waveforms.
Figure 8:
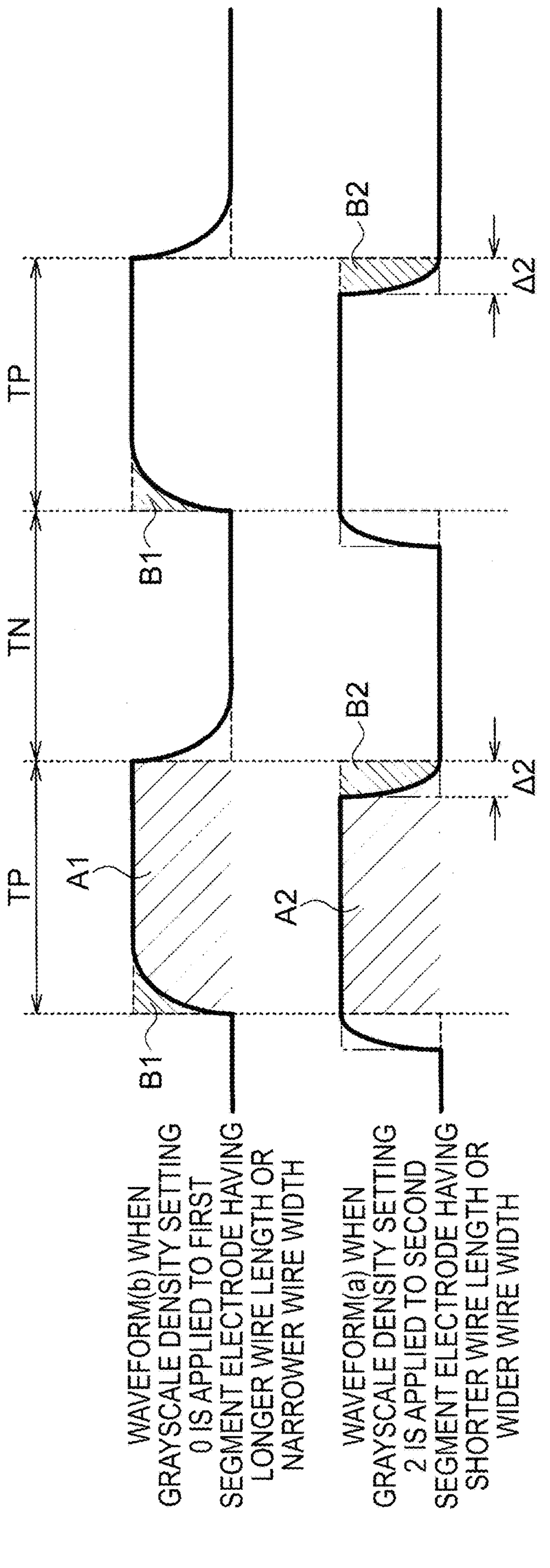
FIG. 8 is a diagram for explanation of a method of homogenizing grayscale densities by the setting options of input waveforms.

FIGS. 7 and 8 are diagrams for explanation of the method of homogenizing the grayscale densities between the respective segment electrodes 101 and 102. Specifically, as described in FIG. 4, the degree of reduction of the pulse width of the input waveform to the second segment electrode 102 with less rounding of the output waveform relative to that of the first segment electrode 101 more affected by the parasitic capacitance or the like in which prominent rounding of the output waveform appears is explained.

FIG. 7 shows settings of the respective pulse width signal groups GS1 and GS2 as input signals transmitted to the respective segment electrodes 101 and 102 of the liquid crystal panel 100. In FIG. 4, homogenization of the grayscale densities among the icons of the liquid crystal panel 100 by making the respective pulse widths of the second pulse width signal group GS2 shorter than the respective pulse widths of the first pulse width signal group GS1 is explained, and the reduction widths of the respective pulse widths may be selected from e.g., the settings as shown in FIG. 7. FIG. 7 shows six types of input waveforms of the grayscale density settings 0 to 5 as the grayscale density settings of the input waveforms. The input waveform of the grayscale density setting 0 has the reduction width of 0 and the pulse width has a duty ratio of 100%. The waveforms of the grayscale density settings 1 to 5 have reduction widths of Δ1, Δ2, Δ3, Δ4, and Δ5, respectively. As shown in FIG. 7, for example, in the grayscale density setting 1, the pulse widths in the positive polarity period TP and the negative polarity period TN are shorter than those of the input waveform in the grayscale density setting 0 at the duty ratio 100% by Δ1. Regarding the grayscale density settings 2 to 5, the reduction widths are larger in the order of Δ2, Δ3, . . . , and the effective voltages of the input waveforms are lower in the order of the grayscale density settings 2, 3, . . . .

FIG. 8 is the diagram for explanation of the settings of the input waveforms for the rounding of the output waveforms due to the parasitic capacitances or the like generated in the respective segment electrodes 101, 102. In the example shown in FIG. 8, the output waveform shown in the upper part is the output waveform in the first segment electrode 101 in which larger rounding of the waveform as shown by (b) in FIG. 6 appears. The output waveform shown in the lower part of FIG. 8 is the output waveform when the grayscale density setting 2 in FIG. 7 is applied to the second segment electrode 102 with less rounding of the waveform as shown by (a) in FIG. 6.

As described by (b) in FIG. 6, the rounding of the waveform in the first segment electrode 101 shown by the upper part of FIG. 8 is as large as a delay width Ab. On the other hand, the reduction width of the input waveform in the second segment electrode 102 shown in the lower part of FIG. 8 is Δ2. In the example shown in FIG. 8, for the reduction width of the input waveform in the second segment electrode 102, Δ2 smaller than the delay width Ab in the first segment electrode 101 shown by the upper part of FIG. 8 is selected.

Here, the respective effective voltages of the output waveform of the first segment electrode 101 shown in the upper part of FIG. 8 and the second segment electrode 102 shown in the lower part of FIG. 8 are considered. In the output waveform of the first segment electrode 101 shown in the upper part, dimensions of an area shown by A1 corresponds to the effective voltage in the first segment electrode 101. Dimensions of an area shown by B1 corresponds to the degree of reduction from the ideal output waveform shown in the top part of FIG. 6. Further, in the output waveform of the second segment electrode 102 shown in the lower part of FIG. 8, dimensions of an area shown by A2 corresponds to the effective voltage in the second segment electrode 102. Dimensions of an area shown by B2 corresponds to the degree of reduction from the ideal output waveform shown in the top part of FIG. 6.

When the large reduction of the effective voltage corresponding to the delay width Ab in FIG. 6 appears in the first segment electrode 101, the grayscale density setting 2 is selected for the input waveform of the second segment electrode 102, and thereby, the effective voltages of the respective segment electrodes 101 and 102 may be made equal. Specifically, the grayscale density setting 2 is selected for the input waveform of the second segment electrode 102, and thereby, the dimensions of the area shown by B1 corresponding to the amount of reduction of the effective voltage in the first segment electrode 101 in the upper part of FIG. 8 and the area shown by B2 corresponding to the amount of reduction of the effective voltage in the second segment electrode 102 in the lower part of FIG. 8 may be made equal. Therefore, the dimensions of the areas shown by A1 and A2 corresponding to the effective voltages applied to the respective segment electrodes 101 and 102 may be made equal.

Further, in the embodiment, the correlations between the grayscale levels and the pulse widths are set in the first grayscale density setting data and the second grayscale density setting data so that the effective voltages to the pixels of the liquid crystal panel 100 in the respective grayscales may be equal.

When the respective segment electrodes 101 and 102 are desired to be displayed in the same grayscale densities, the effective voltages applied to the respective electrodes may differ due to the parasitic capacitances or the like and the electrodes may be displayed in different grayscale densities. However, according to the above described configuration, the input waveforms are set to make effective voltages applied to the respective segment electrodes 101 and 102 equal, and thereby, even when wire forms connecting to the respective segment electrodes 101 and 102 or the like are different, the same effective voltage may be applied and the grayscale densities of the respective icons may be homogenized.

That is, in the embodiment, the first wire L1 has the longer wire length or the narrower wire width than the second wire L2, and the correlations between the grayscale levels and the pulse widths of the second grayscale density setting data are set so that the pulse widths in the respective grayscales may be shorter with reference to the first grayscale density setting data.

In the above described manner, the input waveform to the second segment electrode 102 may be selected from the respective grayscale density settings 1 to 5 to balance with the grayscale density in the first segment electrode 101 in which the reduction of the effective voltage in the output waveform prominently appears due to the parasitic capacitance or the like. Therefore, the amounts of reduction of the effective voltages in the respective output waveform of the first segment electrode 101 and output waveform of the second segment electrode 102 may be balanced and the grayscale densities of the respective icons may be accurately homogenized.

2. Detailed Configuration Example

Figure 9:
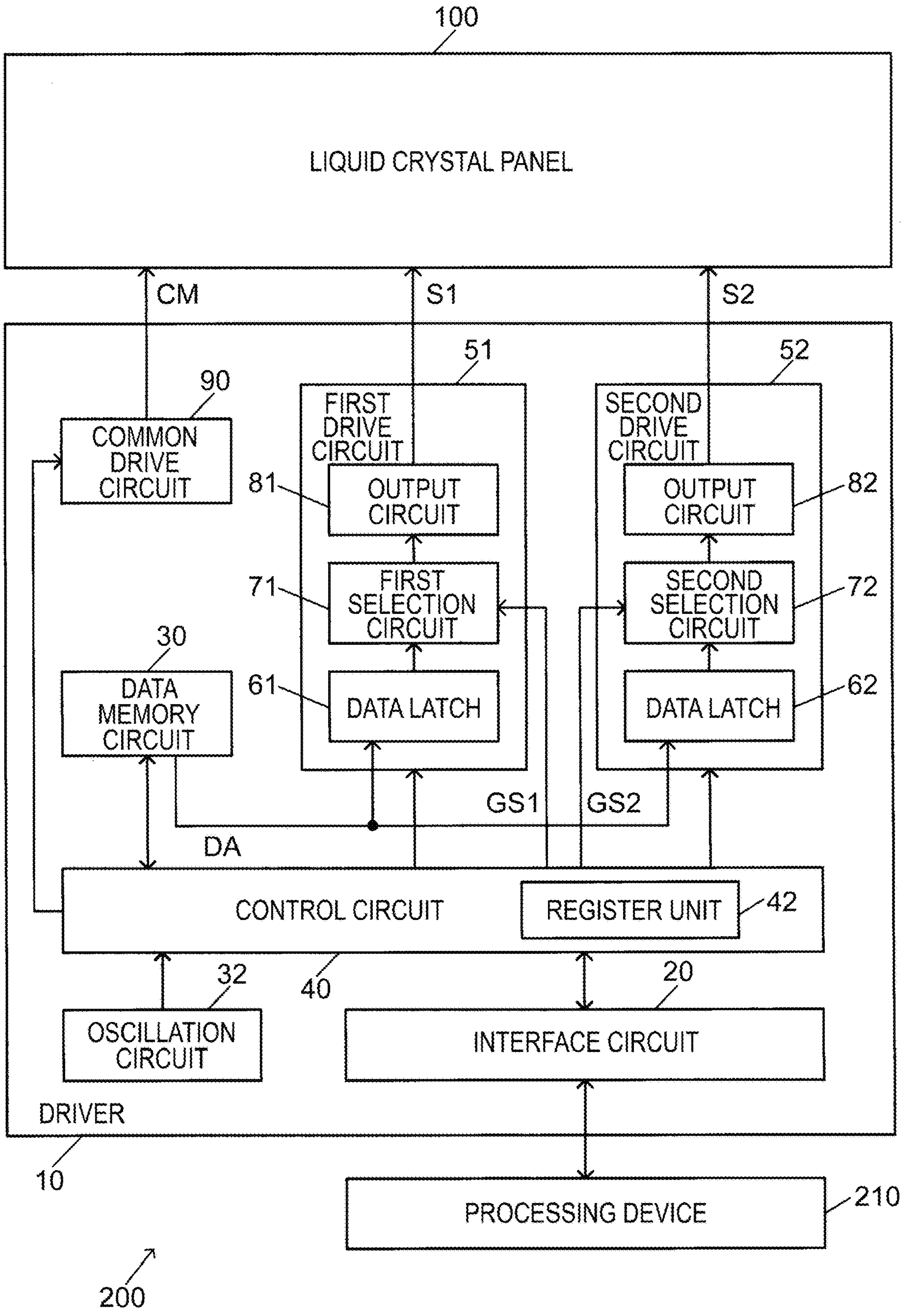
FIG. 9 shows a detailed configuration example of the driver of the embodiment.

FIG. 9 shows a detailed configuration example of the driver 10 of the embodiment. In FIG. 9, the driver 10 is provided with an interface circuit 20, a data memory circuit 30, an oscillation circuit 32, and a common drive circuit 90 in addition to the control circuit 40, the first drive circuit 51, and the second drive circuit 52 in FIG. 1.

The interface circuit 20 is a circuit serving as an interface with an external processing device 210 and performs communication processing between the processing device 210 and the driver 10. For example, the interface circuit 20 receives various kinds of data including commands from the processing device 210, the grayscale data, and the grayscale density setting data. The grayscale data refers to data for setting the grayscale levels and also referred to as display data. The interface circuit 20 may be realized by a serial interface circuit of e.g., the I2C (Inter Integrated Circuit) system or the SPI (Serial Peripheral Interface) system.

That is, the driver 10 of the embodiment includes the interface circuit 20 receiving the first grayscale density setting data and the second grayscale density setting data.

According to the configuration, information can be transmitted and received between the driver 10 and the external processing device 210, and the grayscale densities of the respective icons of the liquid crystal panel 100 can be controlled from the external processing device 210.

The processing device 210 is e.g., a host device of the driver 10 and realized by e.g., a processor or a display controller. The processor is a CPU, a microcomputer, or the like. Note that the processing device 210 may be a circuit device including a plurality of circuit components. For example, in an in-vehicle electronic apparatus, the processing device 210 may be an ECU (Electronic Control Unit).

The data memory circuit 30 is a circuit storing grayscale data etc. and may be realized by a memory e.g., a RAM. The data memory circuit 30 stores grayscale data for setting grayscales in the respective segment electrodes of the liquid crystal panel 100. The grayscale data is received from e.g., the processing device 210 via the interface circuit 20 and stored in the data memory circuit 30.

The oscillation circuit 32 generates an oscillation signal and outputs a clock signal based on the oscillation signal. The respective circuits of the driver 10 including the control circuit 40 operate based on the clock signal.

The control circuit 40 has the register unit 42. The register unit 42 is realized by e.g., a flip-flop circuit or the like. The register unit 42 stores grayscale density setting data corresponding to the respective grayscale levels.

The common drive circuit 90 outputs a common drive signal CM and drives the common electrode of the liquid crystal panel 100. For example, the driver 10 has a terminal from which the common drive signal CM is output and the common drive signal CM is output to the common electrode of the liquid crystal panel 100 via the terminal. The common drive signal CM is e.g., a signal polarity-inverted with respect to each frame.

The first drive circuit 51 includes a data latch 61, a first selection circuit 71, and an output circuit 81. The second drive circuit 52 includes a data latch 62, a second selection circuit 72, and an output circuit 82. The data latches 61 and 62 are a first data latch and a second data latch, respectively, and the output circuits 81 and 82 are a first output circuit and a second output circuit, respectively.

The data latches 61 and 62 latch the grayscale data DA from the data memory circuit 30. For example, the data latches 61 and 62 latch the grayscale data DA based on latch signals from the control circuit 40.

The first selection circuit 71 selects a pulse width signal according to the grayscale level of the grayscale data DA latched by the data latch 61 from the first pulse width signal group GS1. Then, the output circuit 81 performs buffering or the like of the selected pulse width signal and outputs the segment drive signal for PWM drive to the first segment electrode 101. The second selection circuit 72 selects a pulse width signal according to the grayscale level of the grayscale data DA latched by the data latch 62 from the second pulse width signal group GS2. Then, the output circuit 82 performs buffering or the like of the selected pulse width signal and outputs the segment drive signal for PWM drive to the second segment electrode 102.

That is, in the embodiment, the first drive circuit 51 includes the first selection circuit 71 to which the first pulse width signal group GS1 is input, and selects the pulse width signal according to the grayscale data from the first pulse width signal group GS1. The second drive circuit 52 includes the second selection circuit 72 to which the second pulse width signal group GS2 is input, and selects the pulse width signal according to the grayscale data from the second pulse width signal group GS2.

According to the configuration, the pulse width signals may be respectively selected based on the grayscale data in the first drive circuit 51 and the second drive circuit 52.

Figure 10:
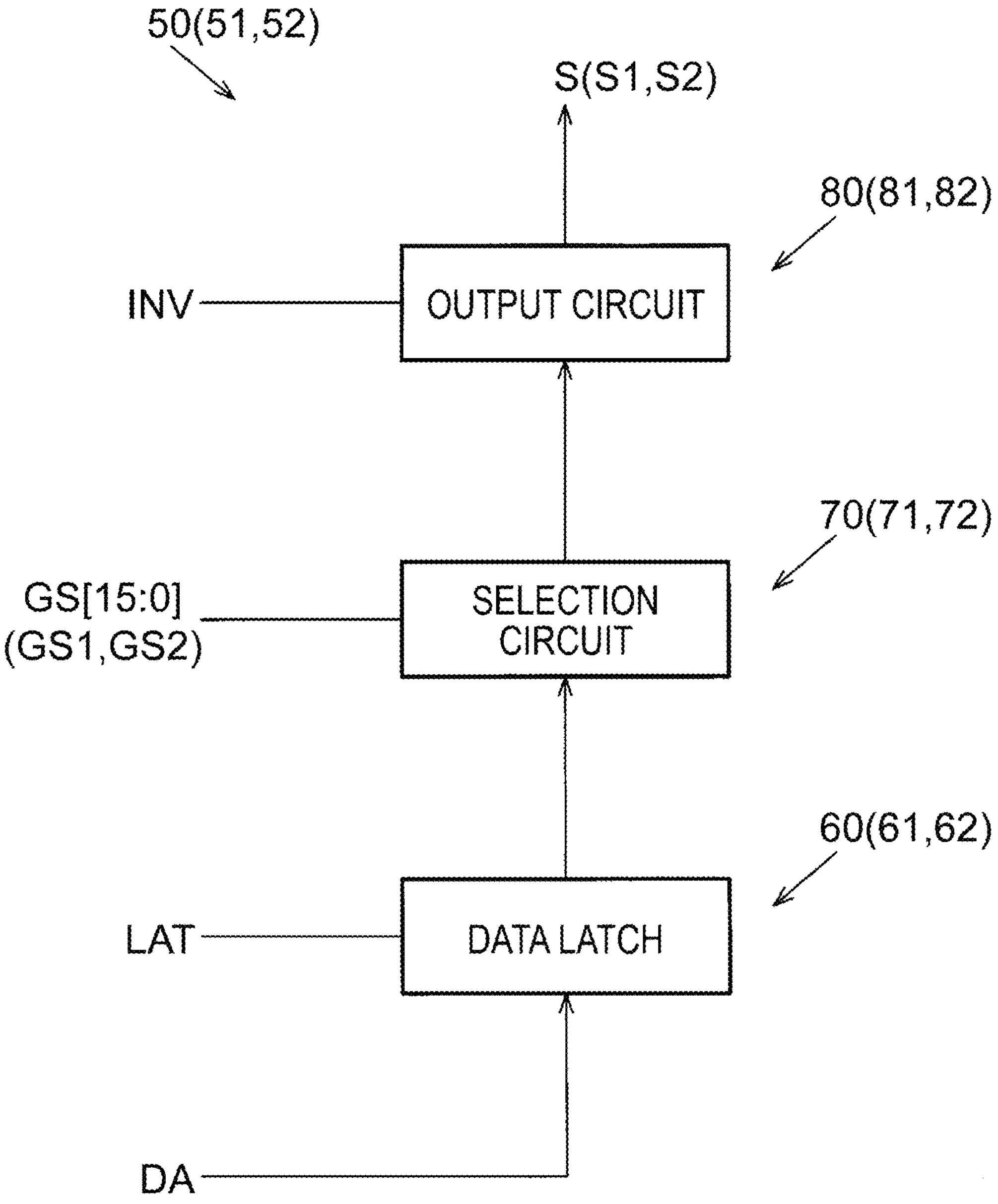
FIG. 10 shows a configuration example of a drive circuit.

FIG. 10 shows specific configuration examples of the first drive circuit 51 and the second drive circuit 52. Hereinafter, the first drive circuit 51 and the second drive circuit 52 are appropriately collectively referred to as "drive circuit 50". Further, the data latches 61 and 62, the first selection circuit 71 and the second selection circuit 72, and the output circuits 81 and 82 are also appropriately collectively referred to as "data latch 60", "selection circuit 70", and "output circuit 80".

Furthermore, the first pulse width signal group GS1 and the second pulse width signal group GS2 are appropriately collectively referred to as "pulse width signal group GS" and the first segment drive signal S1 and the second segment drive signal S2 are appropriately collectively referred to as "segment drive signal S".

The data latch 60 is a line latch circuit. The data latch 60 latches the grayscale data DA from the data memory circuit 30 as a RAM or the like based on a latch signal LAT. The grayscale data DA is 4-bit data as an example in FIG. 12, which will be described later, and thereby, a representation at grayscale levels of 16 levels can be provided. In this case, the data latch 60 latches the grayscale data DA for grayscale display of the respective segment electrodes.

The selection circuit 70 selects the pulse width signal corresponding to the grayscale data DA from the pulse width signal group GS [15:0] based on the grayscale data DA latched by the data latch 60. Then, the selection circuit outputs the selected pulse width signal to the output circuit 80. Then, the output circuit 80 performs buffering or the like of the pulse with signal from the selection circuit 70 and outputs the segment drive signal S.

Figure 11:
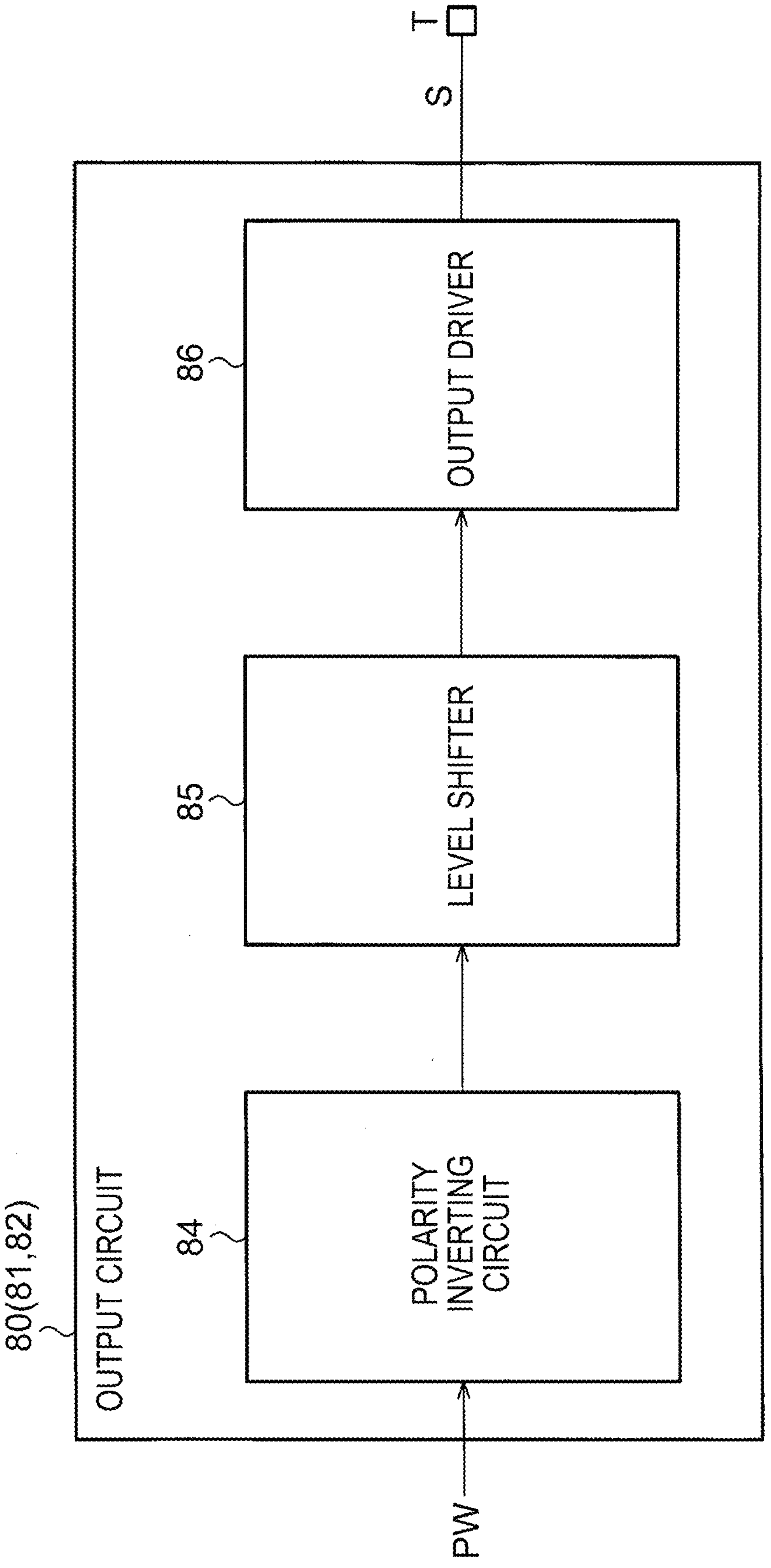
FIG. 11 shows a configuration example of an output circuit.

FIG. 11 shows a configuration example of the output circuit 80. The output circuit 80 includes a polarity inverting circuit 84, a level shifter 85, and an output driver 86. Hereinafter, the first terminal T1 and the second terminal T2 are appropriately collectively referred to as "terminal T". A pulse width signal PW selected from the pulse width signal group GS [15:0] according to the grayscale data DA by the selection circuit is input to the polarity inverting circuit 84 of the output circuit 80, and the polarity inverting circuit performs polarity inversion of the pulse width signal as will be described later in FIG. 13. The level shifter 85 performs a level shift of the voltage of the pulse width signal after the polarity inversion. The output driver 86 buffers the pulse width signal after the level shift and outputs as the segment drive signal S to the terminal T.

FIG. 12 is an explanation diagram showing relationships between the grayscale data DA and the grayscale levels. In FIG. 12, the grayscale data is 4-bit data and the grayscale levels of 16 levels may be represented by the grayscale data. Note that the bit number of the grayscale data is not limited to 4, but may be 3 or less or 5 or more. The number of the grayscale levels is not limited to 16.

The driver 10 of the embodiment includes the register unit 42. The register unit 42 stores the first grayscale density setting data and the second grayscale density setting data. The first grayscale density setting data is for setting the correlations between the grayscale levels and the pulse widths in the first pulse width signal group GS1. The second grayscale density setting data is for setting the correlations between the grayscale levels and the pulse widths in the second pulse width signal group GS2. The control circuit 40 outputs the first pulse width signal group GS1 based on the first grayscale density setting data stored in the register unit 42 and outputs the second pulse width signal group GS2 based on the second grayscale density setting data stored in the register unit 42.

According to the configuration, the setting data for adjustment of the grayscale densities of the respective segment electrodes 101 and 102 may be stored as the first grayscale density setting data and the second grayscale density setting data in the register unit 42, and control of the first drive circuit 51 and the second drive circuit 52 may be performed based on the data.

Figure 13:
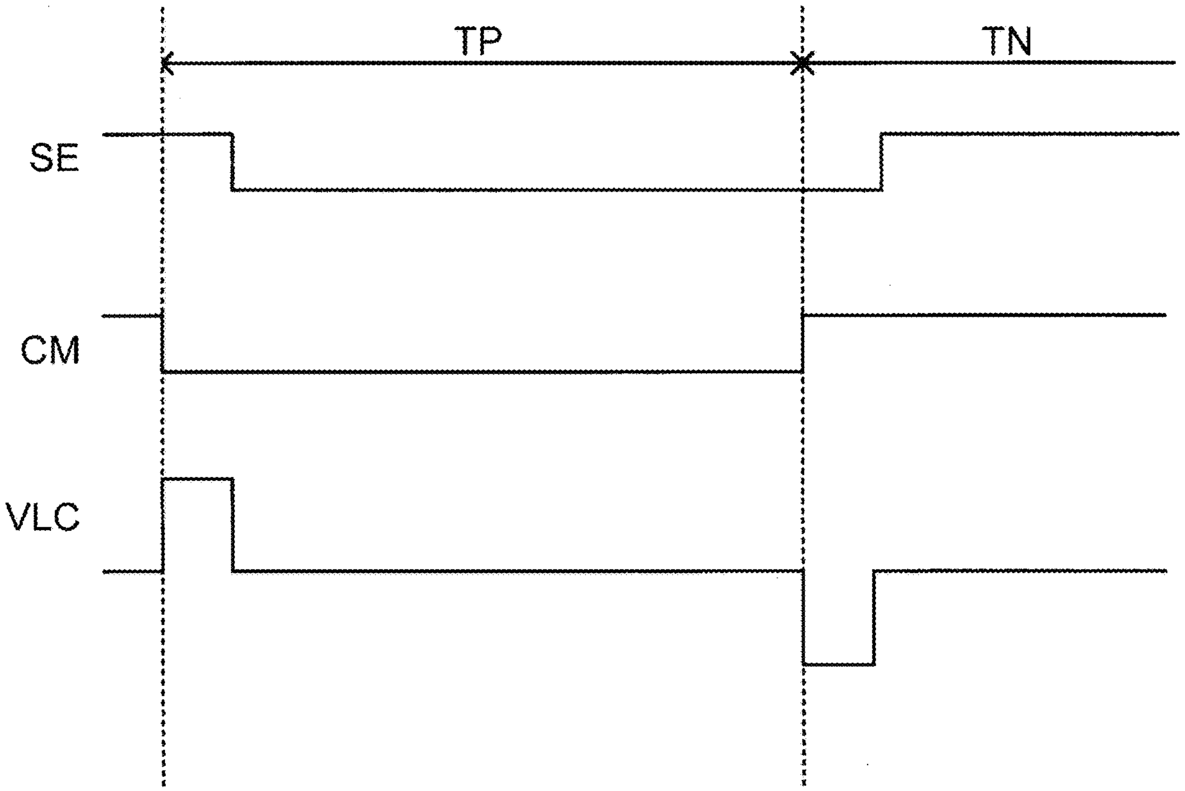
FIG. 13 shows examples of waveforms of a segment drive signal, a common drive signal, and a drive signal for liquid crystal element.

FIG. 13 shows waveform examples of a segment drive signal SE, the common drive signal CM, and a liquid crystal drive signal VLC. The liquid crystal drive signal VLC is a signal corresponding to the first segment drive signal S1 and the second segment drive signal S2 described as above. The positive-polarity segment drive signal SE is output in the positive polarity period TP and the negative-polarity segment drive signal SE is output in the negative polarity period TN. The polarity inversion of the segment drive signal SE is performed by the polarity inverting circuit 84 in FIG. 11. Further, the negative-polarity common drive signal CM is output in the positive polarity period TP and the positive-polarity common drive signal CM is output in the negative polarity period TN. Then, a voltage VCOM-VSEG as a difference between a common driver output voltage VCOM of the common drive signal CM and a segment driver output voltage VSEG of the segment drive signal SE is applied to the respective segment electrodes. Thereby, the voltages of the segment drive signal SE polarity-inverted with respect to each frame as shown in FIG. 13 are applied to the liquid crystal in the segment electrodes of the liquid crystal panel 100 and burn-in or the like is prevented. Note that the signal waveforms used for explanation in FIGS. 6 to 8 etc. correspond to a waveform set at a duty ratio of 100% in the drive signal VLC shown in FIG. 13.

FIG. 14 is an explanation diagram of grayscale density settings for the first pulse width signal group SG1, and FIG. 15 is an explanation diagram of grayscale density settings for the second pulse width signal group SG2. In FIG. 14, grayscale densities for the grayscale level 1 of the first pulse width signal group GS1 are set by parameters P10 to P17. That is, the pulse width W11 of the pulse width signal of GS1 [1] in FIG. 3 is set. Further, grayscale densities for the grayscale level 2 of the first pulse width signal group GS1 are set by parameters P20 to P27. That is, the pulse width W12 of the pulse width signal of GS1 [2] in FIG. 3 is set. Grayscale densities for the other grayscale levels 3 to 15 are set by parameters P30 to P157. The processing device 210 in FIG. 9 sets the parameters P10 to P157 by a command to set the grayscale densities of the first pulse width signal group GS1, and thereby, grayscale density setting data for the first pulse width signal group GS1 is written in the register unit 42.

FIG. 15 is the explanation diagram of grayscale density settings for the second pulse width signal group SG2, and the roles of the respective parameters are the same as those described in FIG. 14. For example, grayscale densities for the grayscale level 1 of the second pulse width signal group GS2 are set by the parameters P10 to P17, and the pulse width W21 is set. Grayscale densities for the other grayscale levels 2 to 15 are similarly set by parameters P20 to P157. The processing device 210 in FIG. 9 sets the parameters P10 to P157 by a command to set the grayscale densities of the second pulse width signal group GS2, and thereby, grayscale density setting data for the second pulse width signal group GS2 is written in the register unit 42.

FIG. 16 shows a specific example of settings of grayscale densities for the grayscale level. FIG. 16 shows an example of settings of the grayscale densities for the grayscale level 1. The grayscale density is e.g., information for designation of setting of the pulse width of the pulse width signal for each grayscale level, e.g., information for setting the duty ratio of the pulse width signal in the PWM drive. FIG. 16 shows a setting example of the grayscale densities of the grayscale level 1 when the grayscale density of the highest grayscale level is 100%. In the example in FIG. 16, when the pulse width of GS1 of the grayscale level 15 as the highest grayscale level is 100%, a percentage of the pulse width W11 of GS1 [1] of the grayscale level 1 relative to the pulse width of GS1 is set by the grayscale density in FIG. 16. For example, as shown in FIG. 16, when (P13,P12,P11,P10)=(0,0,0,0) is set, the pulse width W11 of GS1 [1] is set to 1.1% relative to the pulse width of GS1 at 100%. When (P13,P12,P11,P10)=(0,0,0,1) is set, the pulse width W11 of GS1 [1] is set to 2.2%. According to the configuration, in the grayscale density settings in FIG. 16, the pulse width W11 of GS1 [1] may be set to a desired pulse width with e.g., 1.1% increments, 1.1%, 2.2%, 3.3%, . . . , 18.9%. In this manner, the grayscale densities as settings of the pulse widths for the other grayscale levels may be set. For the second pulse width signal group GS2 in FIG. 4, the grayscale densities as settings of the pulse widths for the respective grayscale levels may be set separately from the first pulse width signal group GS1 in FIG. 3. Note that the pulse width signals with fine increments as shown in FIG. 16 may be generated by the control circuit 40 performing count processing of a counter operating based on a clock signal at a high frequency or the like.

Figure 17:
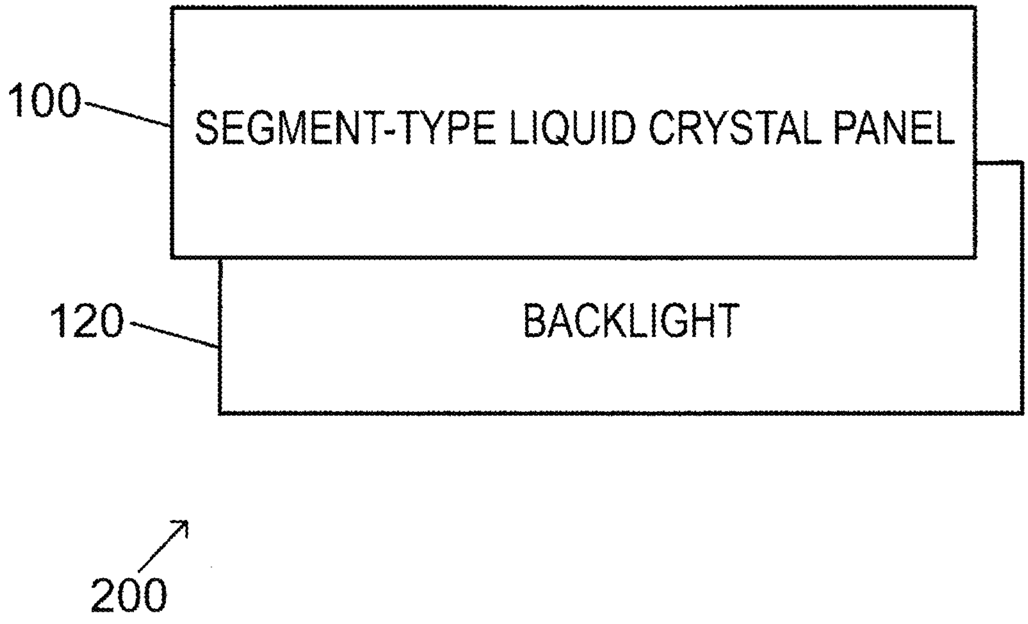
FIG. 17 shows a configuration example of an electrooptical apparatus.
Figure 18:
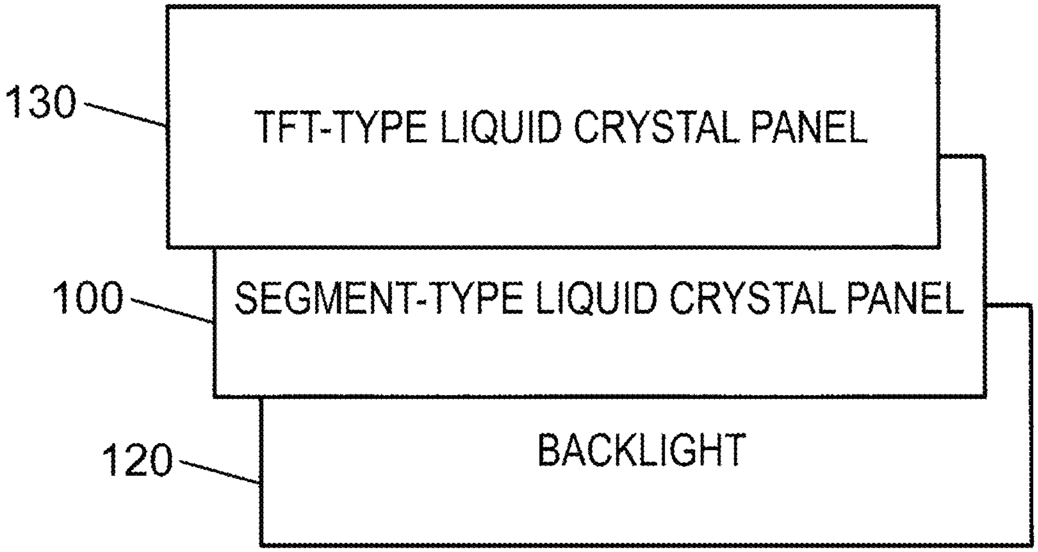
FIG. 18 shows a configuration example of an electrooptical apparatus.

FIGS. 17 and 18 show configuration examples of the electrooptical apparatus 200 of the embodiment. In FIG. 17, the backlight 120 is provided on the back side of the segment-type liquid crystal panel 100. The backlight 120 may be of an edge light type or an immediately beneath type. According to the electrooptical apparatus 200 in FIG. 17, grayscale display of a normal segmented image can be performed. The electrooptical apparatus 200 may be used as a cluster meter for an automobile or a motorbike.

In FIG. 18, the segment-type liquid crystal panel 100 is placed on the back side of a TFT-type liquid crystal panel 130. Alternatively, the segment-type liquid crystal panel 100 may be placed on the front side of the TFT-type liquid crystal panel 130. In the backlight 120, e.g., a plurality of light emitting elements such as LEDs are placed in a lattice form. The display quality of the display of the TFT-type liquid crystal panel 130 or the like is adjusted by control of an amount of transmitted light of the backlight 120.

As described above, the driver of the embodiment is a driver driving a liquid crystal panel of a static drive system, including a first terminal, a second terminal, a control circuit, a first drive circuit, and a second drive circuit. The first terminal is coupled to a first segment electrode of the liquid crystal panel by a first wire. The second terminal is coupled to a second segment electrode of the liquid crystal panel by a second wire having a wire length or a wire width different from that of the first wire. The control circuit outputs a first pulse width signal group and a second pulse width signal group. The first pulse width signal group contains a plurality of pulse width signals corresponding to a plurality of grayscale levels. The second pulse width signal group contains the plurality of pulse width signals corresponding to the plurality of grayscale levels, in which correlations between the grayscale levels and pulse widths are different from those of the first pulse width signal group. The first drive circuit outputs a first segment drive signal to the first terminal based on the pulse width signal selected from the first pulse width signal group according to grayscale data. The second drive circuit outputs a second segment drive signal to the second terminal based on the pulse width signal selected from the second pulse width signal group according to the grayscale data.

According to the embodiment, the first segment electrode of the liquid crystal panel is driven by the first segment drive signal generated based on the grayscale data and the first pulse width signal group. Further, the second segment electrode of the liquid crystal panel is driven by the second segment drive signal generated based on the grayscale data and the second pulse width signal group. Even the same grayscale data can make the pulse widths in the PWM drive different between the first segment electrode and the second segment electrode. Therefore, for the first segment electrode and the second segment electrode having different wire lengths or wire widths, the pulse widths of the segment drive signals may be set not to produce a difference in effective voltage due to the difference in wirelength or wire width. Accordingly, the grayscale densities of the respective icons on the liquid crystal panel may be homogeneously adjusted.

The driver of the embodiment includes a register unit. The register unit stores first grayscale density setting data and second grayscale density setting data. The first grayscale density setting data is for setting correlations between the grayscale levels and the pulse widths in the first pulse width signal group. The second grayscale density setting data is for setting correlations between the grayscale levels and the pulse widths in the second pulse width signal group. The control circuit outputs the first pulse width signal group based on the first grayscale density setting data stored in the register unit and outputs the second pulse width signal group based on the second grayscale density setting data stored in the register unit.

According to the configuration, the setting data for adjustment of the grayscale densities of the respective segment electrodes may be stored as the first grayscale density setting data and the second grayscale density setting data in the register unit, and control of the first drive circuit and the second drive circuit may be performed based on the data.

In the embodiment, in the first grayscale density setting data and the second grayscale density setting data, the correlations between the grayscale levels and the pulse widths are set to make effective voltages to pixels of the liquid crystal panel at the respective grayscales equal.

According to the configuration, the input waveforms are set to make effective voltages applied to the respective segment electrodes equal, and thereby, even when the wire lengths, wire widths, or the like of the wires connecting to the respective segment electrodes are different, the same effective voltage may be applied and the grayscale densities of the respective icons may be homogenized.

In the embodiment, the first wire has a longer wire length or a narrower wire width than the second wire, and, in the second grayscale density setting data, the correlations between the grayscale levels and the pulse widths are set to make the pulse widths at the respective grayscales shorter with reference to the first grayscale density setting data.

According to the configuration, the reduction width of the first segment electrode is set to be smaller than the delay width in the second segment electrode, and thereby, the amounts of reduction of the effective voltages in the respective output waveform of the first segment electrode and output waveform of the second segment electrode may be balanced. Therefore, the grayscale densities of the respective icons may be accurately homogenized.

In the embodiment, the second pulse width signal group is a signal group in which the pulse widths for the grayscale levels are shorter than those in the first pulse width signal group.

According to the configuration, the effective voltage applied to the second segment electrode may be adjusted to be substantially equal to the effective voltage largely reduced in the first segment electrode. Therefore, the effective voltage applied to the first segment electrode and the effective voltage applied to the second segment electrode may be balanced and the grayscale densities of the respective icons on the liquid crystal panel may be homogenized.

The driver of the embodiment includes an interface circuit receiving the first grayscale density setting data and the second grayscale density setting data.

According to the configuration, transmission and reception of information between the driver and an external processing device can be performed, and the grayscale densities of the respective icons on the liquid crystal panel may be controlled from the external processing device.

In the embodiment, the first drive circuit includes a first selection circuit to which the first pulse width signal group is input, selecting the pulse width signal according to the grayscale data from the first pulse width signal group. The second drive circuit includes a second selection circuit to which the second pulse width signal group is input, selecting the pulse width signal according to the grayscale data from the second pulse width signal group.

According to the configuration, the pulse width signals may be selected based on the grayscale data in the respective first drive circuit and second drive circuit.

Further, the embodiment may include the above described driver, the liquid crystal panel, and a backlight of the liquid crystal panel.

As above, the embodiment is explained in detail. A person skilled in the art could easily understand many modifications would be possible without substantially departing from the new matter and the effects of the present disclosure. Therefore, these modified examples fall within the scope of the present disclosure. For example, terms at least once described with different terms used in the broader senses or synonymously in the specification or the drawings may be replaced by the different terms in any part of the specification or the drawings. Further, all combinations of the embodiment and the modified examples fall within the scope of the present disclosure.

Furthermore, the configurations, the operations, etc. of the driver and the electrooptical apparatus are not limited to those described in the embodiment, but various modifications can be made.

What is claimed is:

1. A driver driving a liquid crystal panel of a static drive system, comprising:

a first terminal coupled to a first segment electrode of the liquid crystal panel by a first wire;

a second terminal coupled to a second segment electrode of the liquid crystal panel by a second wire having a wire length or a wire width different from that of the first wire;

a control circuit outputting a first pulse width signal group containing a plurality of pulse width signals corresponding to a plurality of grayscale levels and a second pulse width signal group containing the plurality of pulse width signals corresponding to the plurality of grayscale levels, in which correlations between the grayscale levels and pulse widths are different from those of the first pulse width signal group;

a first drive circuit outputting a first segment drive signal to the first terminal based on a pulse width signal selected from the first pulse width signal group according to grayscale data; and a second drive circuit outputting a second segment drive signal to the second terminal based on the pulse width signal selected from the second pulse width signal group according to the grayscale data.

2. The driver according to claim 1, further comprising a register unit storing first grayscale density setting data for setting correlations between the grayscale levels and the pulse widths in the first pulse width signal group and second grayscale density setting data for setting correlations between the grayscale levels and the pulse widths in the second pulse width signal group, wherein the control circuit outputs the first pulse width signal group based on the first grayscale density setting data stored in the register unit and outputs the second pulse width signal group based on the second grayscale density setting data stored in the register unit.

3. The driver according to claim 2, wherein in the first grayscale density setting data and the second grayscale density setting data, the correlations between the grayscale levels and the pulse widths are set to make effective voltages to pixels of the liquid crystal panel at the respective grayscales equal.

4. The driver according to claim 2, wherein the first wire has a longer wire length or a narrower wire width than the second wire, and in the second grayscale density setting data, the correlations between the grayscale levels and the pulse widths are set to make the pulse widths at the respective grayscales shorter with reference to the first grayscale density setting data.

5. The driver according to claim 4, wherein the second pulse width signal group is a signal group in which the pulse widths for the grayscale levels are shorter than those in the first pulse width signal group.

6. The driver according to claim 2, further comprising an interface circuit receiving the first grayscale density setting data and the second grayscale density setting data.

7. The driver according to claim 1, wherein the first drive circuit includes a first selection circuit to which the first pulse width signal group is input, selecting the pulse width signal according to the grayscale data from the first pulse width signal group, and the second drive circuit includes a second selection circuit to which the second pulse width signal group is input, selecting the pulse width signal according to the grayscale data from the second pulse width signal group.

8. An electrooptical apparatus comprising:

the driver according to claim 1;

the liquid crystal panel; and a backlight device of the liquid crystal panel.

* * * * *